J. B. HOWE.
SCALE FOR CARD FEEDERS.
APPLICATION FILED DEC. 13, 1920.
1,434,058.
Patented Oct. 31, 1922.
3 SHEETS—SHEET 3.
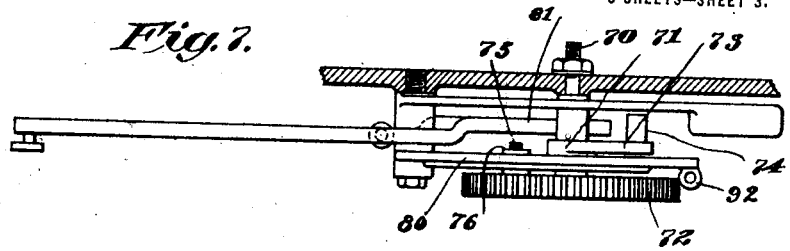
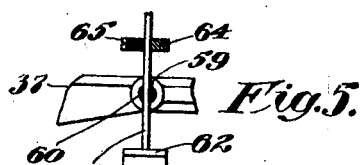
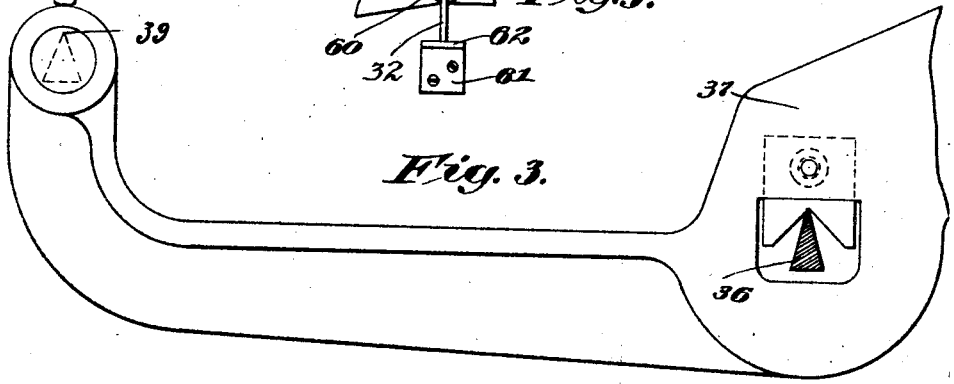
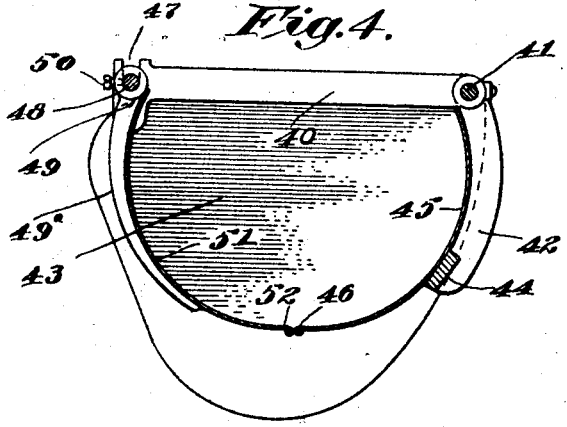
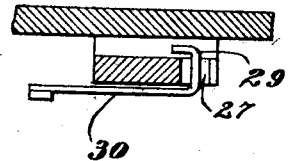
Inventor
Joseph B. Howe
by Roberts, Roberts & Cushman
his Attorneys Patented Oct. 31, 1922.

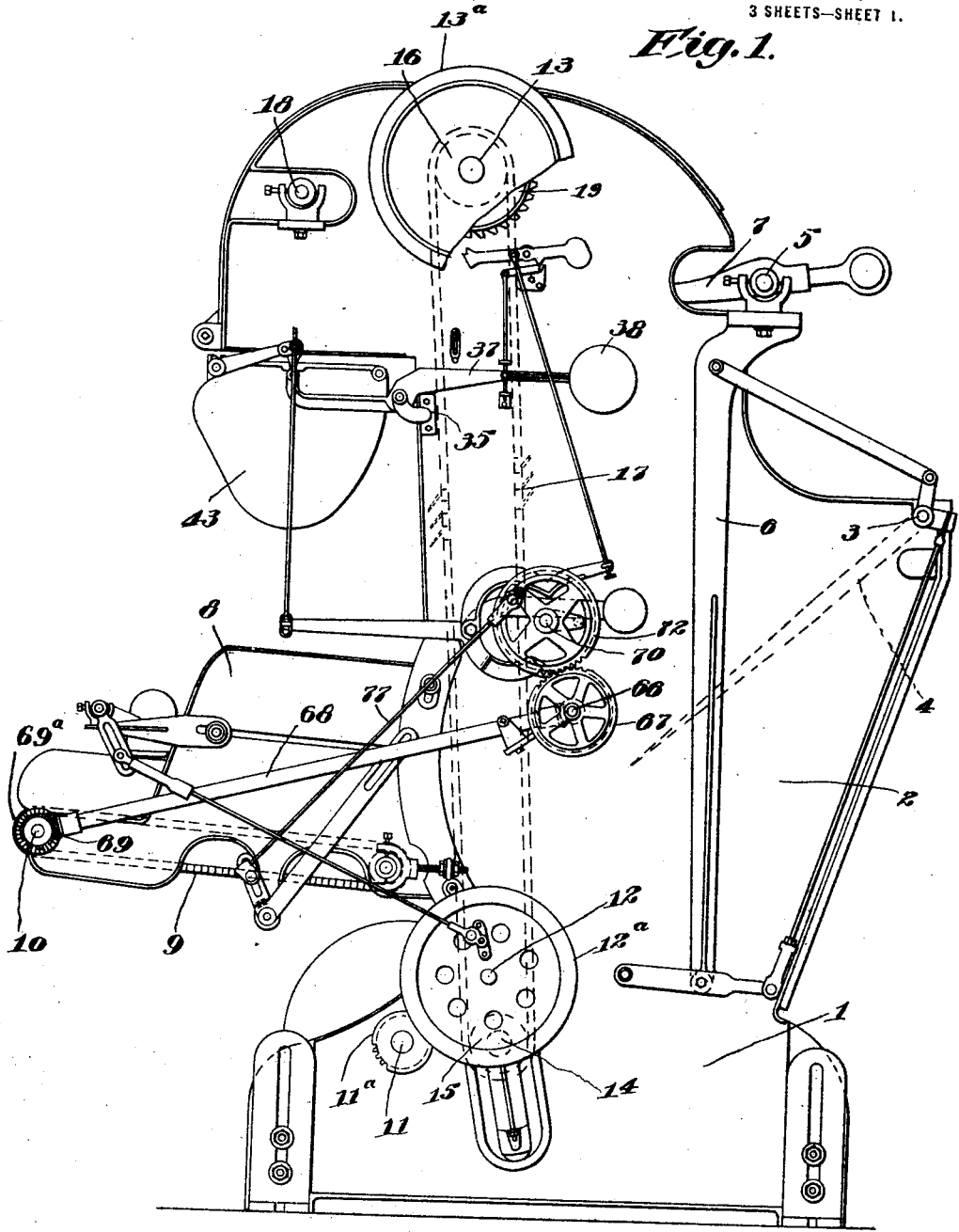

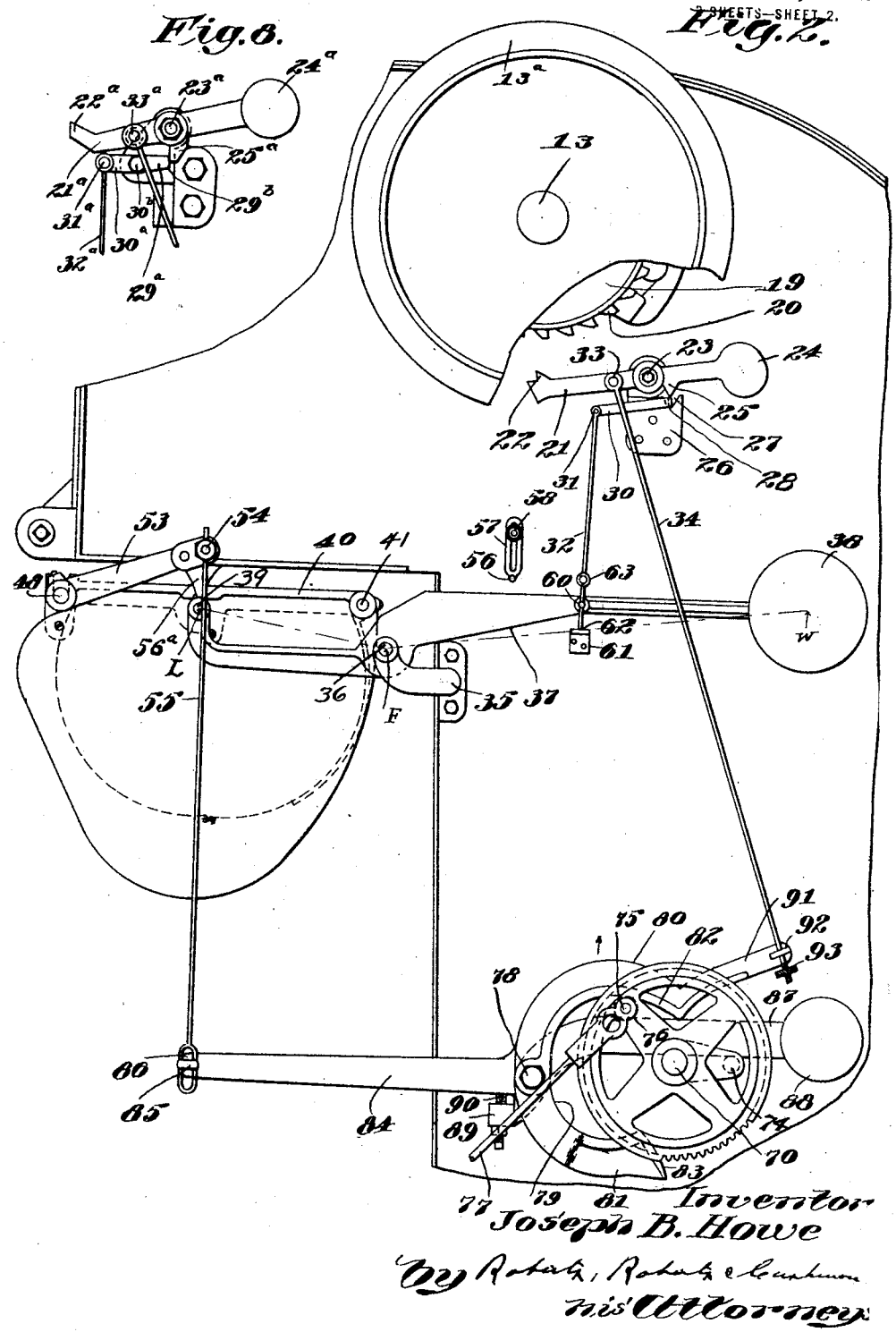

1,434,058

UNITED STATES PATENT OFFICE.

JOSEPH B. HOWE, OF WORCESTER, MASSACHUSETTS, ASSIGNOR TO GEORGE S. HARWOOD & SON, OF BOSTON, MASSACHUSETTS, A COPARTNERSHIP COMPOSED OF SYDNEY HARWOOD AND JOHN H. HARWOOD.

SCALE FOR CARD FEEDERS.

Application filed December 13, 1920. Serial No. 430,567.

*To all whom it may concern:*

Be it known that I, JOSEPH B. HOWE, a citizen of the United States, and resident of Worcester, in the county of Worcester and State of Massachusetts, have invented new and useful Improvements in Scales for Card Feeders, of which the following is a specification.

This invention relates to feeding mechanism for carding machines, and more particularly to an automatic weighing mechanism, with accessory parts, for use in such machines.

The present invention is herein illustrated as applied to a feeder of the "Bramwell" type and such as is illustrated in the patent to Bramwell, 216,373 June 10, 1879. Machines of this character, comprise in general a bin or hopper in which fibre may be piled, an endless conveyor or spike apron for elevating fibre from the bin, a doffer for removing fibre from the spike apron, and a weighing device, comprising a scale pan, for receiving the fibre as it is removed by the doffer. The movement of the spike apron is commonly produced by drive mechanism including a clutch device, the latter being controlled by the weighing mechanism, whereby upon tipping of the scale beam under predetermined load in its pan, the movement of the spike apron is stopped and the delivery of fibre into the pan ceases, the scale pan then being dumped and the beam returned to normal position.

The principal object of the present invention is to so improve the arrangement of the scale beam and pan as to eliminate, so far as practicable, undesirable oscillations or tottering of the beam while the load is being placed in the pan, as well as inaccuracies in weighing due to failure of the material to fall centrally into the pan.

Further objects are to provide against the imposition of undue restraint upon the weighing device by the connections between the same and the clutch mechanism, and also to render the latter very sensitive to the indications of the weighing device. A further object is to simplify the scale pan and the devices whereby the pan is dumped and by means of which the beam is restored to normal position.

Mechanism suitable for carrying into effect the above objects is illustrated in the accompanying drawings in which:—

Fig. 1 is an elevation of the right hand side of the machine;

Fig. 2 is a fragmentary elevation of the upper portion of the right hand side of the machine to larger scale, showing certain of the mechanisms more in detail;

Fig. 3 is a fragmentary detail in side elevation of a scale beam employed in the machine;

Fig. 4 is a transverse cross section of the scale pan;

Fig. 5 is a fragmentary detail, to enlarged scale, showing the clutch operating connection actuated by the scale beam;

Fig. 6 is a fragmentary plan view of a trip device which may be employed in connection with the clutch operating mechanism;

Fig. 7 is a fragmentary plan view illustrating a portion of the mechanism employed for dumping the scale pan and resetting the clutch dog; and Fig. 8 is a side elevation illustrating a modified form of clutch trip device.

The machine herein illustrated resembles the general construction shown in the patent to Bramwell 216,373, June 10, 1879 to which reference may be had for a more general explanation of the purpose and mode of operation of the machine.

1 is the machine frame having formed at its rear side a bin indicated at 2 into which may be dumped the fibre to be treated. 3 is a transverse shaft extending across the frame at its upper rear portion and having secured thereto a vibrating apron 4 which serves to agitate the fibre in the bin. 5 is a transverse shaft carried upon a rock arm 6 and serving to support an oscillating comb arranged upon a lever 7 fast to the shaft 5. Upon the front side of the machine frame is a bracket 8 which serves to support an endless conveyor belt comprising a series of transversely extending slats and commonly known in the art as a "slat apron." This slat apron may be driven by a shaft 10 which receives its motion from the carding machine with which the machine of the present invention is associated. The main shaft of the machine is indicated at 11 and extends transversely from one side of the machine to the other. At the right hand end of the machine the shaft 11 may be provided with a pulley, not herein shown, whereby said shaft may be driven from any suitable source of power.

12 is a shaft extending transversely of the machine frame and having mounted thereon a belt pulley 12ª having fixedly secured thereto a gear wheel not shown meshing with a gear wheel 11ª fast on shaft 11. The shaft 11 thus serves to drive shaft 12 and the pulley 12ª. Near the upper portion of the machine frame is a transverse shaft 13, having mounted at its right hand a clutch comprising a drive pulley 13ª which may be driven by means of a belt, not shown, from the pulley 12ª. 14 is a transverse shaft substantially parallel to the shaft 12. The shaft 14 has mounted thereon a roller, sprocket wheel, or other suitable device about which extends a flexible endless band or chain 17. The member 17 passes over a similar roller or sprocket carried by the shaft 13, which serves to impart motion thereto. The belt 17 is provided with a plurality of transversely extending slats or bars having projecting therefrom spikes or pins for lifting the fibre in the bin 2. Such member 17 with its slats and pins is commonly termed the "spike apron".

At 18 is a transverse shaft in the upper forward portion of the frame which receives an oscillating movement from any suitable source, as for example, the shaft 13, and which serves to support an oscillating doffing device or "pin board," not shown, for removing the fiber from the spike apron 18.

At 19 is indicated the disengaging element of a clutch mechanism which may be of a type such as is disclosed in the patent to Howe 998,003, July 18, 1911 or of the kind illustrated in my copending application serial No. 430,568 filed December 13, 1920. The disengaging element 19 of the clutch is provided with lugs or teeth 20 with which is adapted to engage the tooth 22 of a dog 21, such dog being pivoted to turn about a pin 23 suitably secured in the machine frame. The dog 21 may be counterweighted as by means of the weight 24 whereby it normally tends to swing into position to cause engagement of the tooth 22 with one of the lugs 20. The wheel 19 is thereby prevented from rotating and acts to disengage the driving elements of the clutch which are normally interposed between the pulleys 13ª and the shaft 13. This permits the shaft 13 to come to rest while the pulley 13ª continues to rotate.

The dog 21 is provided with a downwardly extending lug to the right of the pin 23, the lower surface of which may rest upon the upper edge of the arm 29 of a trip lever 30 (Figs. 2 and 6). The lower edge 28 of the arm 29 which is relatively thin and preferably of sheet material, rests in a notch 27 formed in a bracket 26 secured to the machine frame. Such lower edge serves as a fulcrum about which the trip device may turn, the shorter arm of such trip lever device being the distance between the lower and upper edges of the member 29, while the longer arm of such lever is measured by the distance between the lower edge 28 and the end 31 of the arm 30.

Pivotally secured at the point 31 of the arm 30 is a depending rod 32 whereby such trip device may be actuated. At the point 33 of the lever to the left of the pivot 23, the dog 21 may have pivotally secured thereto the upper end of a connecting rod 34 whereby the dog may be reset after having been released by manipulation of the trip device 30.

35 is one of a pair of brackets, of which one is located at each side of a machine frame and each of which is provided with a knife edge fulcrum member 36 having its edge directed upwardly. 37 is a scale beam member of which there is one at either side of the machine frame, such members resting upon the respective knife edges 36. If desired, the scale beam members may be provided with counterweights 38 at one end thereof. At the opposite end, each beam member is provided with a knife edge 39, such knife edges forming fulcrums for pan supporting members 40. The members 40, at their rear ends are provided with openings through which passes a rod 41 by means of which the members 40 may be rigidly secured together. As herein disclosed, each of the members 40 is provided with a downwardly projecting rib 42 having connected to its lower portion a transversely extending bar 44 whereby the ribs 42 may be secured together. The bar 44 may be integral with the two ribs 42 or formed as a separate element as desired. 43 is an end piece, of which one is secured to each of the members 40, being attached to said member and to the rib 42 in any suitable manner as for example by rivets or bolts. 45 is a curved member of sheet metal or other suitable material which is attached to the bar 41 and to the ribs 42 and also to the bar 44, such member 45 terminating at 46 and forming the rear side wall of the scale pan. The members 40 at their forward ends are provided with notches or slots 47 in which is pivoted to turn a transverse shaft 48. Secured to the shaft 48 are a series of collars 49 secured thereto by screws 50, such collars having curved depending arms 49ª. 51 is a member of sheet metal or other suitable material, curved to conform to the surfaces of the arms 49ª and terminating at 52, such member forming the front or movable wall of the scale pan. Secured to the right hand end of the rod 48 is an arm 53, the free extremity of which, indicated at 54, lies substantially vertically above the fulcrum 39. 55 is a connecting rod depending freely from the end 54 of the lever 53. The purpose of this rod will be described hereinafter. A slotted bracket 57 is secured to the frame above the right hand portion of the scale beam member 37 by means of a bolt 58 (Fig. 2) such bracket having projecting outwardly therefrom a stop pin 56 which overlies the upper edge of the scale beam and serves to limit the swinging movement thereof. A bracket 56ª depends from the frame in position to engage the end of beam 37 directly above fulcrum 39 whereby to limit upward swing of the beam, and thereby providing a free space above member 40 to permit unobstructed oscillation of the latter. The beam is somewhat overweighted by weight 38, so that when the pan is empty, the end of the beam contacts with the lower side of bracket 56ª.

The rod 32 at its lower end passes freely through an opening 59 in a pin 60 outstanding from the right hand face of the scale beam 37. The extreme lower end of the rod 32 normally rests upon the upper surface 62 of a shelf-like bracket 61 suitably secured to the machine frame. At 63, Fig. 2, the rod 32 may be formed with a single coil of such dimensions as to prevent its passage through the opening 59 in the pin 60. If desired, the coil 63, may be replaced by a collar 64 as indicated in Fig. 5, such collar being adjustably secured to the rod 32 by a set screw 65.

A stub shaft 66 projects from the right hand surface of the frame 1, and has mounted to turn freely thereon a gear wheel 67. This gear wheel has fast thereto a bevel gear which meshes with a similar bevel gear on a shaft 68 mounted to turn in suitable bearings. At its opposite end the shaft 68 is provided with a bevel gear 69 meshing with a bevel gear 69ª carried by the shaft 10. The gear 67 thus receives movement from the carding machine which is supplied with fibre by the machine herein disclosed. A second stub shaft 70 projecting from the machine frame has mounted thereon a gear wheel 72 which meshes with the gear wheel 67. The gear wheel 72 has integral therewith a sleeve 71 to which is fast an arm 73 carrying at its extremity a stud or pin 74. If desired, such stud 74 may have mounted thereon an anti-friction roller or other similar device. 75 is a pin secured to the gear 72 and having mounted upon its inner end a cam engaging roll 76.

78 is a stud fixed in the machine frame and having arranged to swing thereon a lever member 79, such lever member having upper and lower arms 80, 81 respectively, and a laterally projecting arm 84. The upper arm 80 is provided with a cam surface 82 with which may engage the roll 76, while the lower arm 81 has a cam surface 83 for engagement with the pin or roll 74. At its outer extremity the arm 84 is provided with a pin 85 which engages within an elongated vertical slot 86 at the lower end of the connecting rod 55. The pin 85 may be provided with a head overlying the spaced members of the rod 55 which form the slot, whereby to prevent accidental disengagement of the parts. 87 is a lever also pivoted on the pin 78 and having a weight 88 at its outer extremity. At the opposite side of the pin 78 the lever 87 is provided with a short arm 89 which underlies the arm 84 and is provided with an adjustable contact member 90. The arm 80 has an upwardly and rearwardly extending portion 91 having formed thereon a lug 92 provided with an opening through which freely passes the lower end of the rod 34. The rod 34 at its lower extremity may be provided with screw threads engaging with an adjustable stop member 93 held in adjusted position by a lock nut if desired.

A modified form of trip device for the clutch dog is shown in Fig. 8 wherein the dog is indicated at 21ª pivoted at 23ª and having the tooth 22ª. 24ª is a counterweight tending normally to swing the dog in a clockwise direction and 25ª is a lug projecting downwardly from the dog. 30ª is a trip lever pivoted at 30ᵇ and having at its left hand extremity a pivot pin 31ª to which is secured the actuating rod 32ª. At the right hand extremity of the arm 29ª of the lever 30ª is a contact surface 29ᵇ forming substantially a circular arc about the pivot 30ᵇ. With the parts as indicated in Fig. 8, the lug 25ª lies in contact with surface 29ᵇ and thus the dog is prevented from swinging. If, however, the lever 30ª is swung about its pivot, the upper edge of the surface 29ᵇ may be carried below the lug 25ª, whereupon the latter with the dog is permitted to swing for actuating the clutch disengaging element. For resetting the dog a connecting rod may be secured thereto as at 33ª.

The operation of the mechanism above described is as follows, it being assumed that the parts are as shown in Figs. 1 and 2. The fibre piled in the bin 2 will be carried up by the spike apron 17 and doffed therefrom by the oscillating doffing device carried by the shaft 18. The fibre as it is thus discharged from the spike apron falls into the scale pan which lies immediately below the doffing device. With the parts as indicated at Fig. 2 it is clear that any slight movement of the scale beam will not affect the position of the rod 32 nor are movements of the actuating rod 55 opposed in any manner by the lever 84, in view of lost motion connections between the same. Furthermore as the rod 55 lies substantially in the vertical plane of the fulcrum 39, it is clear that its weight has little or no effect in opposing free movement of the pan. As the fibre is deposited in the pan, the pan may freely swing upon the fulcrum 39, and thus regardless of the position at which the fibre is deposited in the pan, the effective weight of the lever may be considered as acting at the fulcrum point 39 which is at a fixed distance from the fulcrum 36.

It will be evident from consideration of Figs. 1 and 2, that the fulcrum 36 lies below the pan fulcrum 39, that is to say, below the point of application of the load in the pan. The fulcrum 39 is also below the point of application of weight 38. The theoretically equivalent scale beam is indicated by the dot and dash line L, F, W, in Fig. 2. While in its initial position, the beam is slightly over-weighted by the member 38 so as to cause its left hand end (Fig. 2) to engage bracket 56ª, at the instant a sufficient load has been placed in the pan to balance weight 38, the beam may be considered to be in unstable equilibrium, and thereafter, even a very small further quantity of material deposited in the pan suffices to cause the latter to descend in a single continuous movement as far as permitted by stop 56. The arrangement of the fulcrum below the points of application of the loads thus serves to eliminate oscillation of the beam, as the turning moment of the loaded pan constantly increases as it descends, as compared with that of the weight, so that there is no tendency for the pan to swing back after once overbalancing the weight of the member 38.

In the above discussion the scale beam members at opposite ends of the pan have been considered as constituting a single unitary scale beam.

As the pan descends, the right hand end of the scale beam moves up until it is stopped by the pin 56. Just prior to such stopping, however, the pin 60 strikes the member 63 of the rod 32, thereby lifting the latter and tilting the trip lever sufficiently to disengage the lug 25 from the upper edge of the member 29. The dog 21 is now free to turn under the action of the weight 24 until its tooth 22 engages a lug 20 of the wheel 19. This disengages the clutch elements, stopping the further rotation of the shaft 13 and thereby causing the feed of fibre to the doffing device to cease. The shaft 68, however, is still driven from the carding machine, and as the roll 76 comes in contact with the cam surface 82, the arm 80 is lifted, while the arm 84 is depressed. The pin 85 is thus brought into engagement with the lower end of the slot 86 and, through the connecting rod 55 and the arm 53, serves to swing the wall 51 of the scale pan outwardly, whereby to dump the fibre therefrom on to the slat apron 9. As soon as the roll 76 passes the surface 82, the weight 88, acting through the lever arms 87 and 89, operates to restore the arm 84 to the position indicated in Fig. 2, thereby closing the scale pan. The stud or roll 74 now moves into engagement with the cam surface 83, causing the arm 81 to swing downwardly and at the same time moving the arm 84 upwardly. As the scale pan has already been permitted to close by return of the arm 84 to the position of Fig. 2 under action of weight 88, such upward movement causes the pin 85 to engage the upper part of the slot 86, and through the connecting slot 55 and arm 53, swings the scale pan with the scale beam 37 back to normal position as indicated in Fig. 2, wherein beam 37 contacts with stop bracket 56ª. This releases the rod 32, so that the trip device may be reset. As the arm 84 moves upwardly to reset the scale pan and the beam, the arm 91 swings downwardly, carrying the lug 92 into contact with the stop 93 on the rod 34. This movement is sufficient to swing the dog 21 away from the clutch wheel 19, thus permitting the clutch to become reengaged and causing the shaft 13 to resume its rotation. As the stud 74 passes from the cam surface 83, the arm 84 drops slightly until it rests upon the stop stud 90 with the pin 85 suspended midway of the slot 86, and with the lug 92 spaced somewhat above the stop member 93. In the downward movement of the dog 21, away from the clutch wheel 19, the lug 25 is lifted from behind the member 29, and the trip lever is permitted to swing beneath the same, and as the lever arm 91 moves upward slightly as above indicated, the dog is permitted to drop again until the lug 25 rests securely upon the upper edge of the member 29. With the machine in this condition the spike apron and doffing device can convey fibre upwardly from the bin and deliver it into the scale pan, the operation being thus repeated indefinitely.

While the mechanism described is regarded as a preferred embodiment of the invention, it is clear that various changes and modifications might be made therein without departing from the general spirit of the invention.

Having thus described the invention in a preferred embodiment of the same, together with the mode of operation thereof, what I claim and desire to secure by Letters Patent of the United States is:

1. A card feeder having in combination, means for delivering fibre, a weighing device arranged to receive such fibre as it is delivered, said device comprising a scale pan and beam, and fulcrum means for said beam, the parts being so constructed and arranged that as the scale pan descends under a predetermined weight of fibre, its effective turning movement about such fulcrum constantly increases and mechanically actuated means for restoring said beam to load receiving position after removal of the load from the pan.

2. A machine of the class described, having means for delivering fibre, a scale device for weighing such fibre, said scale device comprising a beam and pan which at the instant the pan has received its proper weight of fibre are in unstable equilibrium and power actuated means for dumping said pan and for restoring it to load receiving position.

3. A machine of the class described having in combination, means for delivering fibre, and a scale device for receiving and weighing such fibre, such scale device comprising a beam, a pan, a counter balance for the beam, the fulcrum for said beam being below the points of application of the loads formed by the scale pan and counterweight, respectively and means for assisting such counterbalance in restoring said beam and pan to normal load receiving position after discharge of fibre from the filled pan.

4. A carding feeder having fibre delivering means, a device for receiving and weighing such fibre, such device comprising a scale pan, means for supporting said scale pan to move downwardly under predetermined load, the parts being constructed and arranged whereby substantially to eliminate oscillation of said supporting means while the pan is receiving its load, and power actuated means for restoring said pan to load receiving position after discharge of its load.

5. A machine of the class described having in combination, fibre delivering means, fibre weighing means comprising a scale pan operable to arrest the operation of said delivering means when said scale pan has received a predetermined weight of fibre, means for supporting said scale pan whereby to permit it to initiate its downward movement under load without encountering interference from associated parts, certain of said associated parts being constructed and arranged positively to restore said pan to normal position after discharge of its load.

6. A machine for feeding cards having in combination, fibre manipulating means, fibre weighing means, connections between said fibre manipulating means and said weighing means whereby the latter controls the operation of the former, a rotating shaft and connections therefrom to said weighing means whereby positively to move the latter at predetermined times, all of such connections being constructed and arranged to permit operative movement of said weighing means to be initiated without substantial effect upon said connections.

7. A textile machine having in combination, fibre manipulating means, disengageable drive elements therefor, a fibre weighing device comprising a balanced scale pan, and lost motion connections between said pan and such drive elements whereby said pan may initiate its movement under load without interference from said connections, but permitting said pan before completing its downward movement to actuate said connections for disengaging said elements.

8. A machine of the class described comprising a fibre manipulating mechanism, a shaft for driving the same, a clutch having disengageable elements for driving the shaft, a stop dog for the clutch, a trip for said dog, a trip operating rod, fixed means for supporting said rod, a projection on said rod, a scale beam, and an element carried by said scale beam and movable into engagement with said projection upon swinging of said beam.

9. A textile machine, comprising a drive clutch, a stop dog for said clutch, a trip for said dog, a rod having its upper end connected to said trip, a fixed support for the lower end of said rod, a scale beam having a part provided with an opening for the free passage of said rod, and an abutment member carried by said rod above said scale beam for contact by the latter after said beam has been swung through a substantial arc.

10. A device of the class described including a clutch mechanism and automatic means for controlling the same, and having in combination, a clutch dog and a trip lever therefor, said lever having a relatively short arm engageable with said dog for retaining the same in inoperative position, a relatively long arm, a rod depending from the long arm and having its lower end normally resting upon a fixed support, and means engageable with an element of said rod whereby it may be lifted from the support.

11. The combination, in a machine of the class described, of a drive clutch having a counterweighted stop dog, a weighing device, a trip lever for said dog comprising a short arm arranged to prevent said stop dog from moving under the action of its counterweight a relatively long arm a rod depending from said long arm, means normally supporting the weight of said rod, and means actuable by movement of the weighing device for lifting said rod.

12. A device of the class described having in combination a centrally pivoted lever having a tooth at one end and a counterweight at the opposite end, and a trip device for said lever comprising a member having a portion thereof extending substantially at right angles to the main portion, said angularly extending portion being of small thickness compared to its height, a bracket having a notch with which the lower edge of such portion engages, the upper edge of said portion serving to engage and support a lug carried by the weighted end of said lever, and connections to the main part of said trip for rocking the same about the lower edge of said angular portion as an axis whereby to disengage the upper edge thereof from said lug.

13. A device of the class described having in combination an elongated scale pan comprising rigid end supports having depending arms, a rear wall of sheet material extending between and fixedly secured to said arms, a rod journalled to turn in the front end portions of said supports, a front wall of sheet material fixed to said rod and a lever arm fast to said rod at one end thereof whereby to turn said rod and swing said front wall.

14. A device of the class described, comprising a scale pan comprising rigid end supports and a swingable front wall, fulcrum means engaging said end supports substantially centrally of their lengths, a lever arm connected to said front wall and extending to a point substantially above one of said fulcrums, a rod secured to said lever and extending substantially in the vertical plane of said fulcrums and power driven means for moving said rod.

15. In combination, a scale beam, a scale pan having end supports and a movable wall, fulcrum means for engaging said end supports substantially centrally thereof, a lever arm secured to said movable wall and extending to a point in the vertical plane of said fulcrums, a rod pivotally connected at one end to said lever and extending in said vertical plane, said rod having an elongated loop at its opposite end, and an actuating device loosely engaging said loop whereby said scale pan is permitted to initiate bodily downward movement upon swinging of the beam without interference from said actuating device.

16. A textile machine having in combination, fibre manipulating mechanism, a fibre weighing device comprising a scale beam and pan, means for so supporting said beam and pan that at the instant the pan has received its proper load the parts are in unstable equilibrium, means for dumping the pan, and beam actuated means for restoring such beam to load receiving position after discharge of its load.

17. A machine of the class described comprising in combination an automatic weighing device comprising a scale beam and pan, means for so supporting said beam and pan that they are in unstable equilibrium at the instant the pan has received its load, means to dump said pan when said beam has been caused to swing under predetermined load, and a cam device for swinging said beam in the reverse direction to restore it to load receiving position.

18. A machine of the class described comprising fibre weighing mechanism, and having in combination a scale pan having a hinged side, and automatically acting mechanism for opening said side for dumping the contents of said pan, comprising a rotatable shaft, a pair of actuating members carried thereby, a lever having a bifurcated arm providing a pair of cams located upon opposite sides of said shaft, said cams being provided with surfaces for engagement with the respective actuating members and a connection from the other arm of said lever to the movable wall of said scale pan, one of said members serving to open said scale pan and the other of said members acting to restore the scale beam to its normal load receiving position.

19. A machine of the class described comprising in combination fibre manipulating mechanism, a clutch for controlling the actuation thereof, a stop dog for the clutch, a trip for the dog, a scale beam having a scale pan thereon provided with a movable wall, connections between said beam and trip whereby to actuate the latter by swinging of the beam, a pair of relatively fixed cranks rotatable about a common axis, a lever having members engageable by said cranks whereby said lever may be positively swung in opposite directions, a resetting device for said trip, and connections between said lever and said movable scale pan wall and trip resetting device respectively.

20. A machine of the class described, comprising a scale beam having a dumping pan supported thereby, and power actuated means for dumping said pan and for swinging said scale beam.

21. A machine of the class described, comprising a scale beam, a pan supported thereby, said pan comprising a movable wall, and power actuated means comprising a common element for moving said wall and for swinging said scale beam.

22. A card feeder having in combination fibre delivering means, means including disengageable clutch elements for controlling actuation of the fibre delivery means, fibre weighing means comprising a scale pan for receiving fibre from the delivering means, means for supporting the scale pan whereby to permit it to initiate its downward movement under load without encountering interference from associated parts, and connections actuable upon continued movement of the scale pan for causing disengagement of said clutch elements.

23. A card feeder comprising a spike apron for elevating fibre, means including disengageable clutch elements for driving said apron, a scale pan normally located in a position to receive fibre discharged from said apron, a scale beam having a fulcrum at one end for supporting said pan, a fulcrum for the beam intermediate its ends, a counterweight at the other end of the beam, the pan and fulcrum normally lying in a plane above the beam fulcrum, and below the point of connection of the counterweight to the beam, and lost motion connections between the beam and clutch serving to disengage the elements of the latter during the downward swing of the loaded pan.

24. A card feeder having in combination clutch controlled, fibre delivering means, a scale device for weighing the fibre from the delivering means, such device comprising a beam, a pan fulcrumed at one end of the beam, a fulcrum for the beam, a counterweight at the other end of the beam, the beam fulcrum being below the points of application of the loads formed by the scale and counterweight respectively, and conections between the scale beam and the controlling clutch for the fibre delivering means constructed and arranged to cause said latter means to stop as the loaded pan descends.

25. A card feeder having in combination fibre elevating means, a clutch for controlling said elevating means, a device for receiving and weighing fibre delivered by the elevating means, said device comprising a scale pan, means supporting said scale pan to move downwardly under a predetermined load of fibre, the parts being constructed and arranged substantially to eliminate oscillation of the supporting means while the pan is being filled, and connections for transmitting movement from the pan supporting means to the clutch to stop the elevating means as the pan descends.

26. A machine for feeding cards having in combination fibre delivering means, means including a trip controlled clutch for determining actuation of the delivering means, movable weighing means for weighing fibre discharged from the delivering means, and normally stationary means, actuable after a predetermined movement of the weighing means, to operate the clutch trip to stop the delivering means.

27. A machine of the class described comprising in combination fibre delivering means, clutch means for transmitting operative movement to the delivering means, a trip for disengaging the clutch parts to bring the delivering means to rest, a downwardly movable scale pan for receiving fibre from the delivering means, a scale beam for supporting the pan, and means actuable by the scale beam after a predetermined downward movement of the scale pan for actuating the clutch trip to stop the delivering means.

28. A card feeder having in combination, means for delivering fibre, means for controlling the operation of such fibre delivering means, a scale pan for receiving fibre from said delivering means, a counterweighted scale beam upon which said pan is fulcrumed, means providing a fulcrum for said pan, the parts being so constructed and arranged that as the scale pan descends under a predetermined weight of fibre, its effective turning movement constantly increases, and means operated by the momentum of the pan in descending for so actuating the controlling means for the fibre delivering means as to stop the operation of the latter.

29. A card feeder having in combination means for delivering fibre, a clutch for controlling such fibre delivering means, a scale device for weighing out predetermined quantities of fibre as delivered, said scale device comprising a beam and pan which at the instant the pan has received its proper weight of fibre are in unstable equilibrium, and connections between said scale device and the clutch so constructed and arranged as to actuate the clutch to stop the delivering means as the loaded scale pan descends.

30. A card feeding machine comprising fibre delivering means comprising a scale beam, a dumping scale pan fulcrumed thereon and normally positioned to receive fibre from said delivering means, and power actuated means for dumping said pan and for swinging said scale beam from dumping to load receiving position.

31. A card feeding machine comprising fibre delivering means, a scale beam, a scale pan fulcrumed upon said beam, said pan comprising a movable wall, and power actuated means comprising a common element for moving said wall in opposite directions for opening the pan and for closing it, respectively.

32. A machine of the class described comprising a scale beam, a dumping scale pan carried thereby, said pan having a movable wall member, and power means constructed and arranged successively to open and close said pan after the latter has descended under the weight of its load, and for restoring the pan to normal, load receiving position.

33. A card feeder comprising a scale beam, a scale pan carried thereby and movable downwardly by gravity when filled, means whereby said pan may be dumped, and power actuated means for raising the emptied pan to normal, load receiving position.

34. A card feeder comprising a scale beam, a scale pan fulcrumed upon one end thereof, said pan when loaded descending under the action of gravity, and power actuated means moving in the vertical plane of the fulcrum of the pan for restoring the pan and beam to normal position after dumping of the load.

35. A card feeding machine comprising fibre delivering means, a clutch device for determining actuation of said delivering means, a trip lever for operating said clutch device to stop said delivering means, a scale pan for receiving fibre from the delivering means, a scale beam for supporting said pan, and a rod secured to said trip lever and having an element engageable with an element of the scale beam after a predetermined downward movement of the scale pan for actuating the trip lever to cause the delivering means to stop.

36. A card feeding machine comprising a scale beam, a scale pan fulcrumed adjacent to one end thereof, a lever, power means for oscillating said lever, and connections between said lever and scale pan, said connections being constructed and arranged to permit free descent of the pan under load, and thereafter to transmit movement from the lever to the emptied pan for restoring the latter to normal position.

Signed by me at Boston, Massachusetts, this third day of December, 1920.

JOSEPH B. HOWE.

Certificate of Correction.

It is hereby certified that in Letters Patent No. 1,434,058, granted October 31, 1922, upon the application of Joseph B. Howe, of Worcester, Massachusetts, for an improvement in "Scales for Card Feeders," an error appears requiring correction as follows: In the grant the name of the assignee was erroneously given as "Harwood & Son," whereas said name should have been given as *George S. Harwood & Son*, as shown by the record of assignments in this office; and that the said Letters Patent should be read with this correction therein that the same may conform to the record of the case in the Patent Office.

Signed and sealed this 12th day of December, A. D., 1922.

[SEAL.]  KARL FENNING,
*Acting Commissioner of Patents.*